US006614394B2

(12) United States Patent
Honda et al.

(10) Patent No.: US 6,614,394 B2
(45) Date of Patent: *Sep. 2, 2003

(54) SUPPORT REQUEST PROCESSING SYSTEM USING GPS DATA FOR LOCATING A PERSON REQUESTING A SUPPORT

(75) Inventors: Kazuhiro Honda, Kashiba; Toshiro Mise, Hirakata; Kiyotaka Takehara, Kitakatsuragi-gun; Akira Oya, Hirakata, all of (JP)

(73) Assignee: Matsushita Electric Works, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/768,461

(22) Filed: Jan. 25, 2001

(65) Prior Publication Data

US 2001/0009407 A1 Jul. 26, 2001

(30) Foreign Application Priority Data

Jan. 26, 2000 (JP) ........................................ 2000-018093

(51) Int. Cl.⁷ .............................. G01S 5/02; H04B 7/185
(52) U.S. Cl. ............................... 342/357.1; 342/357.09; 342/357.07
(58) Field of Search ..................... 342/357.09, 357.1, 342/357.07

(56) References Cited

U.S. PATENT DOCUMENTS 5,119,102 A   6/1992  Barnard
5,379,224 A   1/1995  Brown et al.
5,796,365 A   8/1998  Lewis
6,198,914 B1  3/2001  Saegusa ....................... 455/404
6,222,484 B1  4/2001  Seiple et al. ............ 342/357.09

FOREIGN PATENT DOCUMENTS

| DE | 42 19 894 A1 | 12/1993 |
| DE | 4313281 | 10/1994 |
| DE | 43 18 441 A1 | 12/1994 |
| DE | 4421508 | 2/1995 |
| DE | 196 19 330 A1 | 12/1996 |
| DE | 4318441 | 5/1997 |
| DE | 197 29 645 A1 | 1/1999 |
| DE | 197 55 075 A1 | 6/1999 |

OTHER PUBLICATIONS

English translation of the German Examination Report of Jan. 10, 2003.

Primary Examiner—Theodore M. Blum
(74) Attorney, Agent, or Firm—Rader, Fishman & Grauer PLLC

(57) ABSTRACT

A system using GPS data for locating a person requesting a support. The system includes a mobile terminal carried by a person to acquire the GPS data from GPS satellites and transmits the same upon a request by the person to a message center where the GPS data is processed to calculate the person(s position. The mobile terminal simply acquires the GPS data which is invalid for calculation of the position if the request is made where the GPS satellite is not available. For successfully locating the person's position, the mobile terminal acquires the GPS data regularly at different times in accordance with a time schedule and stores the time-series sets of the GPS data which are transmitted together with a current GPS data acquired in response to the support request, thereby giving the latest available position of the person if the current GPS data is found invalid.

15 Claims, 2 Drawing Sheets

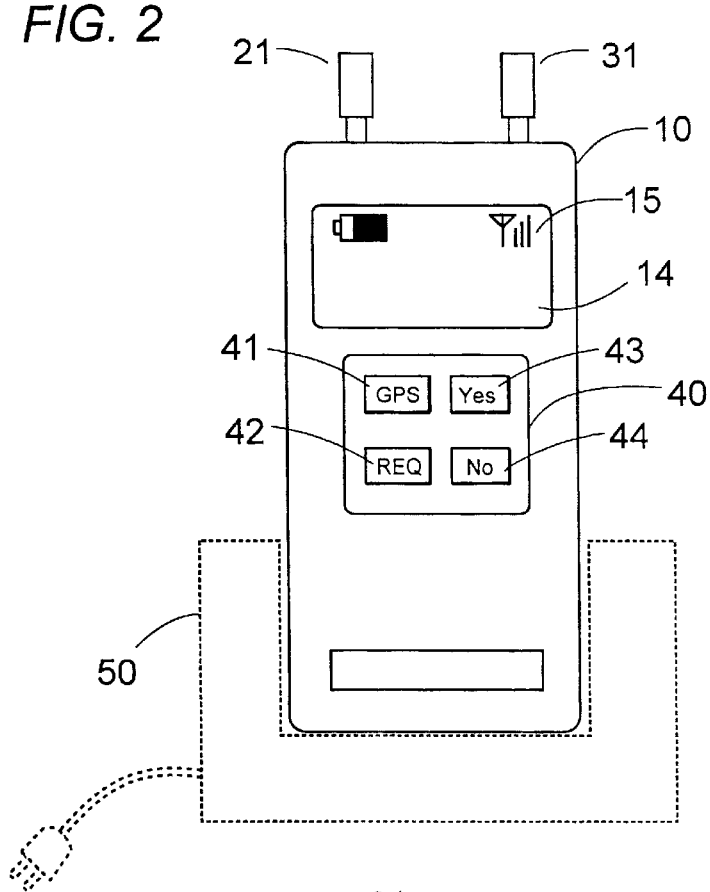
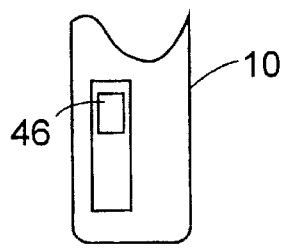
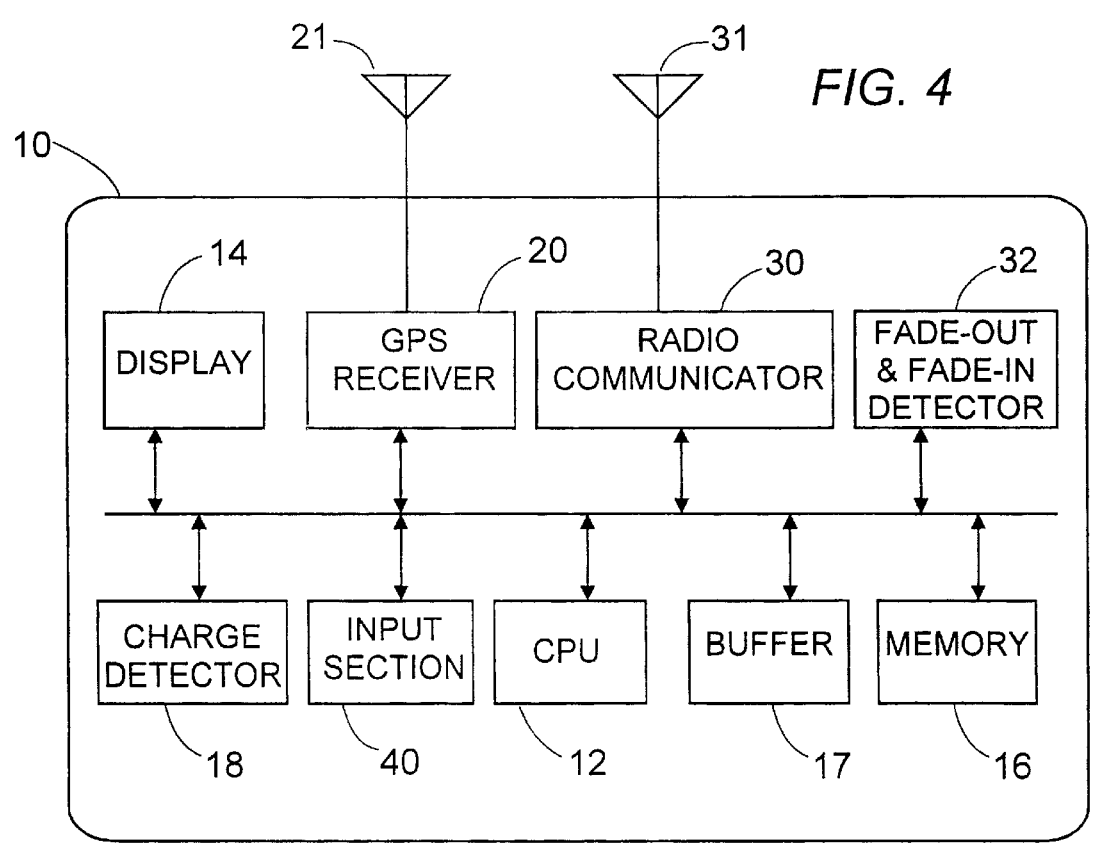

SUPPORT REQUEST PROCESSING SYSTEM USING GPS DATA FOR LOCATING A PERSON REQUESTING A SUPPORT

BACKGROUND OF THE INVENTION

1. Field of the Invention

The present invention is directed to a support-request processing system using GPS data for locating a person requesting a support, and more particularly to such a system using a decentralized Global Positioning System (GPS) to locate a person requesting the support.

2. Description of the Prior Art

A decentralized GPS system such as disclosed in U.S. Pat. Nos. 5,119,102 and 5,379,224 has been proposed to reduce search of a person requesting an urgent support for rescue. The system utilizes a GPS terminal to be carried by a person, and a message center which is linked through a radio communication network to the GPS terminal and acts in response to a support-request signal from the person to give a warning message including a position of the person for prompting a suitable support. The GPS terminal is capable of acquiring GPS data from GPS satellites and of transmitting the support-request signal together with the GPS data to the message center. The GPS data is processed at the message center rather than at the GPS terminal for calculating a position of the mobile terminal so as to eliminate a calculation circuitry from the GPS terminal for reducing the cost of the GPS terminal. Thus decentralized GPS system, however, is still insufficient in that when the person is in a dead-area such as a building where the GPS data from the GPS satellites is not available but the radio communication with the message center is available, the support-request signal cannot be accompanied with a valid GPS data so that the message center fails to determine the position of the person, making it difficult to rescue the person.

SUMMARY OF THE INVENTION

In view of the above insufficiency, the present invention has been achieved to provide a system which is capable of estimating the position of the person even when the person issues the support-request signal after moving into a place, for example, a building where the GPS data is not available. The system of the present invention includes a mobile terminal having an identification (ID) code and being adapted to be carried by a person, and a message center linked to the mobile terminal over a radio communication network. The mobile terminal is composed of a GPS receiver capable of acquiring the GPS data from GPS satellites, a radio transmitter capable of transmitting the GPS data to the radio communication network, and a request key which issues the support-request signal. The support-request signal activates the GPS receiver to acquire current GPS data and activates the radio transmitter to transmit the current GPS data together with the support-request signal and the ID code to the message center. The message center has a database table storing a relation between the ID code and personal information about the person carrying the mobile terminal. Upon receiving the support-request signal accompanied with the GPS data and the ID code, the message center calculates the position of the mobile terminal and relates the calculated position to the personal information about the person with reference to the table. Then, the message center gives a support-request message including the calculated position and the related personal information for prompting a suitable support action. The characterizing feature of the present invention resides in that the mobile terminal is supplemented with a fail-safe recording means which acts independently of the support-request signal to acquire the GPS data from the GPS satellites at different times in accordance with a predetermined time schedule and stores plural time-series sets of thus acquired GPS data, and that the fail-safe recording means is linked to the radio transmitter so that the time-series sets of the GPS data are transmitted together with the current GPS data to the message center in response to the support-request signal. Therefore, even if the person moves into a building where the GPS satellites can not be reached but the mobile terminal can communicate with the message center, i.e., only an invalid GPS data is available, the message center can rely on the latest valid GPS data in the time-series sets to calculate the position of the person, giving a reliable estimation for locating the person.

In a preferred embodiment, the mobile terminal includes a start key which activates the fail-safe recording means to store the time-series sets of the GPS data.

The system may include a charger which is coupled to the mobile terminal to charge a rechargeable battery incorporated in the mobile terminal. In this case, the fail-safe recording means may be activated when the mobile terminal is disconnected from the charger. For this purpose, the mobile terminal has a charger detector which detects the disconnection of the mobile terminal from the charger and provides a start signal upon detection of the disconnection. In response to the start signal, the fail-safe recording means is activated to accumulate the time-series sets of the GPS data.

Also, the mobile terminal may be configured so that the radio terminal is capable of receiving a start signal from the message center through the radio communication network, which start signal activates the fail-safe recording means to accumulate the time-series sets of the GPS data.

Further, the mobile terminal may be programmed to transmit the time-series sets of the GPS data to the message center set by set to give one set of the GPS data at one time in descending time sequence. On the side of the message center, there is provided a check means which checks as to whether the current GPS data and those in the time-series sets is valid for calculation of the position of the mobile terminal. As soon as the GPS data is found to be valid, the check means transmits a stop signal to the mobile terminal, causing the mobile terminal to stop transmitting the remaining sets of the GPS data. Thus, it is possible to eliminate redundant procedures for prompt determination of the latest position of the mobile terminal.

In order to get a more comprehensive behavior of the person after requesting the support, the message center may transmits a follow-up request signal to the mobile terminal after a predetermined time from a first catch of calculating the position of the mobile terminal in reply to the support-request signal. In response to the follow-up request signal, the mobile terminal acts to acquire a fresh GPS data and transmit the fresh GPS data to the message center for updating the position of the mobile terminal, i.e., the person. Therefore, it is possible to update the latest position of the person still moving after requesting the support, assuring a reliable search for the person.

In addition to or instead of the above function of issuing the follow-up request signal from the message center to the mobile terminal, the mobile terminal itself may include a follow-up means which makes a process of acquiring a fresh GPS data from the GPS satellite and transmitting the same to the message center periodically at a predetermined time interval after the mobile terminal transmits the GPS data in response to the support-request signal.

Additionally, the system may include a monitoring capability of logging the position of the person when the person is going out of an effective radio communication area with the message center such that the person can be located at the last position if it is required to search the person for any reason other than by the person's request. For this purpose, the mobile terminal may include a fade-out detecting means which detects whether the mobile terminal is moving closer to a border of the effective communication area based upon a received field intensity of a radio signal transmitted from a base station of the network, and generates a fade-out warning signal when the mobile terminal approaches to the border of the communication area. In response to the fade-out warning signal, the mobile terminal acquires a border GPS data indicative of the location near the border of the communication area and transmits the border GPS data as well as the fade-out warning signal together with the ID code to the message center. With this result, the message center can acknowledge the position of the person near the border of the communication area in relation to the personal information. The message center includes a storing means which, in response to the fade-out warning signal, stores the calculated position based upon the border GPS data with a tag indicating the presence of the fade-out warning signal. Therefore, when a search of the person is necessitated for any reason after the person moves out of the effective communication area, it is readily possible to retrieve the last position of the person near the border of the communication area, thereby facilitating to search for the missing person.

In this connection, the fade-out detecting means may be programmed to detect whether the mobile terminal is moving closer to the border of the communication area each time the mobile terminal receives the radio signal from the base station. Alternatively, the fade-out detecting means may be programmed to analyze the received field intensities of the radio signals consecutively received at the mobile terminal for the detection.

Further, the mobile terminal may have a revoke means which prohibits the radio transmitter from transmitting a further border GPS data in response to a further fade-out warning signal until an elapse of a predetermined time after the border GPS data is transmitted in response to the previous fade-out warning signal. Whereby, redundant operations of obtaining the duplicate positions of the person near the border of the communication area can be avoided.

In addition to or instead of the above capability of locating the person near the border of the effective communication area, the system may have a capability of recognizing the position of the person reentering the communication area. For this purpose, the mobile terminal is supplemented with a fade-in detecting means which detects whether the mobile terminal reenters the effective communication area based upon the received field intensity of the radio signal transmitted from the base station of the network, and generates a fade-in notice signal when the mobile terminal reenters the area. In response to the fade-in notice signal, the mobile terminal operates to acquire a border GPS data indicative of the position near the border of the area, and transmit the border GPS data as well as the fade-in notice signal together with the ID code to the message center. In this consequence, the message center can acknowledge the position of the person near the border of the communication area in relation to the personal information. Thus obtained position of the person is stored in the message center together with a tag indicating that the person reenters the area such that the person reentering the area can be immediately located. This is particularly advantageous in a situation where a search request by another person is accepted at the message center while the person is out of the communication area.

The fade-in detecting means may be programmed to determine whether the mobile terminal reenters the communication area each time the mobile terminal receives the radio signal from the base station, i.e., the person reenters the area. Alternatively, the fade-in detecting means may be programmed to analyze the received field intensities of the radio signals consecutively received at the mobile terminal for detection of the reentrance of the person.

In order to avoid redundant operations of obtaining the duplicate positions of the person near the border of the communication area, the mobile terminal may include a revoke means which prohibits from transmitting a further border GPS data in response to a further fade-in notice signal until an elapse of a predetermined time after the border GPS data is transmitted in response to the previous fade-in notice signal.

These and still other advantageous features of the present invention will become more apparent from the following detailed description of a preferred embodiment when taken in conjunction with the attached drawings.

BRIEF DESCRIPTION OF THE DRAWINGS

FIG. 2 is a front view of a mobile terminal utilized in the above system,

FIG. 3 is partial side view of the mobile terminal; and;

FIG. 4 is a block diagram showing the internal structure of the mobile terminal.

DETAILED DESCRIPTION OF THE EMBODIMENT

Figure 1:
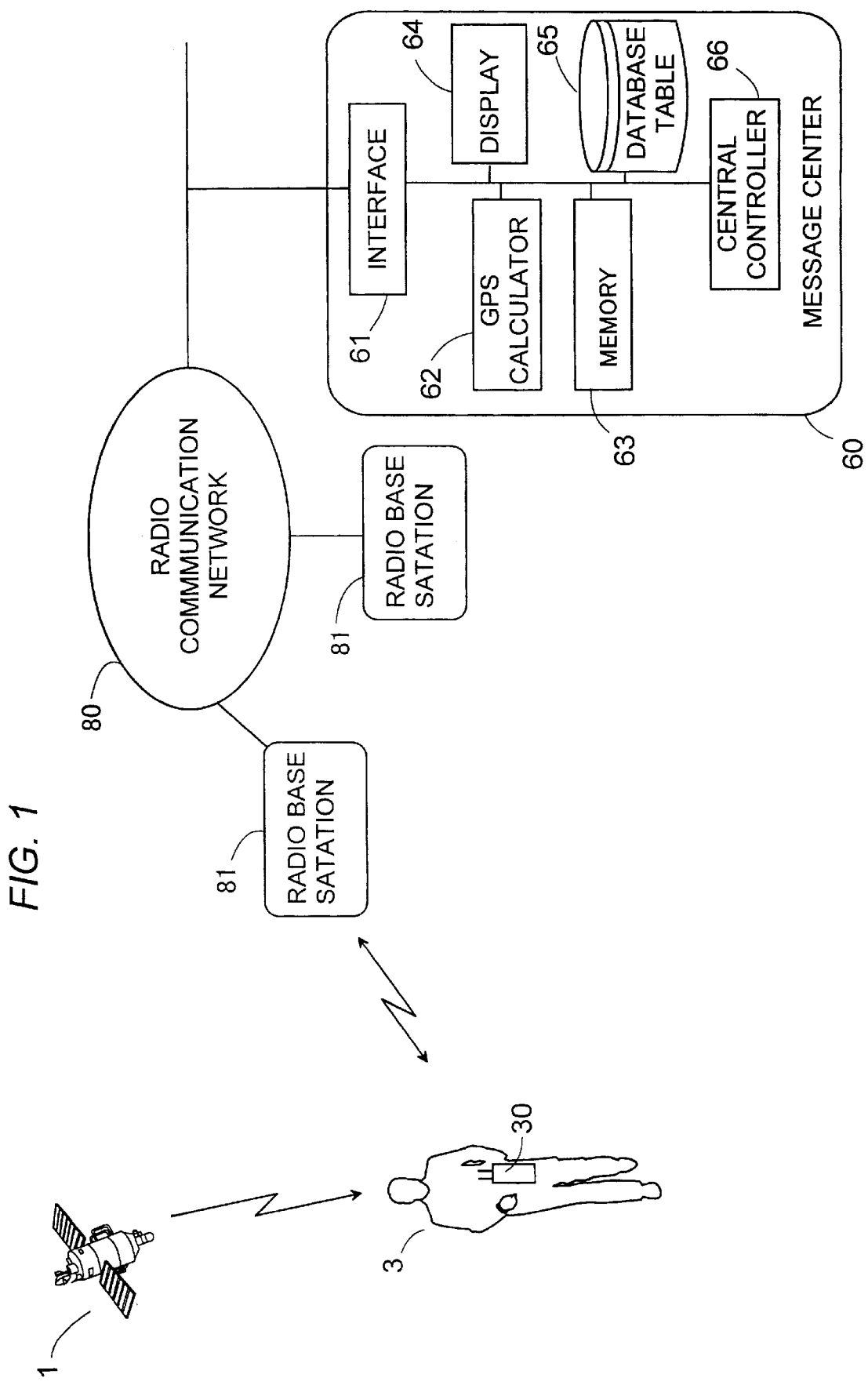
FIG. 1 is a schematic view showing a system in accordance with a preferred embodiment of the present invention.

Referring now to FIG. 1, there is shown a support request processing system using GPS data from GPS satellites for locating a person requesting a support. The system utilizes a global positioning system (GPS) to locate the person in trouble and give a warning message, prompting to take a suitable support or rescue. The system is particularly intended to supervise the person 3 who possibly moves into building or the like place where the GPS satellites 1 cannot be reached. The system includes a mobile terminal 10 adapted to be carried by a person and capable of acquiring GPS data from the GPS satellites 1, and a message center 60 receiving the GPS data from the mobile terminal 10 to calculate a position of the mobile terminal 60, i.e., the person 3 carrying the same. The mobile terminal 10 has a capability of issuing a support-request signal which is transmitted to the message center 60 over a public radio communication network 70 having a plurality of radio base stations 71. The network may be a known cellular phone communication network for PDS, PHS, MCA, CDPD, AMPS, CDMA, GSM or the like system. Upon acknowledgement of the support-request signal, the message center 60 provides a warning message including the calculated position of the person, prompting a suitable action for support or rescue of the person.

The mobile terminal 10 has an identification (ID) code, and includes, as shown in FIG. 4, a GPS receiver 20 with an antenna 21 for acquiring the GPS data from the GPS satellites 1, a radio communicator 30 with an antenna 31 for radio communication with the message center 60 to transmit the support-request signal and the GPS data along with the ID code. Also included in the mobile terminal 10 is a display 14, a memory 16 for storing the GPS data, an input section 40 for issuing the support-request signal, and a CPU 12 for controlling the whole operation of the mobile terminal 10. A rechargeable battery (not shown) is incorporated in the mobile terminal 10 to supply an operating voltage thereto. For charging the battery, the mobile terminal 10 is mounted to a charger 50 which provides a DC charging current from an AC source voltage. Also included in the mobile terminal 10 is a charger detector 18 that detects whether the mobile terminal is disconnected from the charger 60. Under the control of CPU 12, the radio communicator 30 is made active to constantly monitor a received field strength of a radio signal from the nearby base station 71, thereby checking whether the mobile terminal 10 is within an effective communication area with the message center 60. The received field strength is seen on the display 14 by a corresponding indicator 16, as shown in FIG. 2. The GPS antenna 21 and the radio antenna 31 may be combined into a single complex antenna which can be coupled to the OPS receiver 20 and the radio communicator 30 through a mixer-and-distributor.

As shown in FIG. 2, the input section 40 includes a GPS data acquisition key 41 for acquiring the GPS data a request key 42 for generating the support-request signal, a confirmation key 43, and a cancel key 44 of which functions will be discussed later. Prior to issuing the support-request signal, the mobile terminal 10 is enabled to accumulate the GPS data. Upon the GPS data acquisition key 41 being pressed, CPU 12 activates the GPS receiver 20 to acquire the GPS data at different times in accordance with a predetermined time schedule to thereby accumulate the time-series sets of the GPS data together with corresponding time stamps in the memory 16.

Due to the restricted capacity of the memory 16, a limited number of the updated GPS data are always stored. For example, the GPS data are collected at every one (1) hour and ten (10) sets of the updated GPS data are always stored in the memory 16. It is noted in this connection the GPS receiver 20 does not check whether the GPS satellites 1 are available, i.e., the whether the acquired GPS data is valid for calculation of the position of the mobile terminal at the message center 60. Therefore, the GPS data may be valid or not simply depending on where it is collected. When the request key 42 is pressed in a condition after the time-series sets of the GPS data has been accumulated in the memory 16, CPU 12 firstly activates the GPS receiver 20 to acquire a current GPS data from the GPS satellites 1 and store the same together with a time stamp in a buffer 17, and subsequently activates the radio communicator 30 to call the message center 60. Immediately upon connection with the message center 60, the mobile terminal 10 retrieves the time-series sets of the GPS data from the memory 16 into the buffer 17 and transmits the current GPS data and the time-series sets of the GPS data as well as the time stamps thereof to the message center 60 together with the ID code and the support-request signal.

The message center 60 includes, as shown in FIG. 1, an interface 61 for the network 80, a GPS calculator 62 for calculating the position of the mobile terminal 10 based on the GPS data, a display 84 as one of alarm means for giving a warning message indicative of the support-request from the person and the calculated position of the mobile terminal 10. Further, the message center 60 includes a database table 65, and a central controller 66 which controls the overall operations of the message center 60. The database table 65 stores personal information about an individual person registered to the system including a name, age, sex, residence, phone number, family data, etc. in addition to the mobile terminal ID code assigned to that person. With reference to the table 65, the central controller 66 can identify the support requesting person by the mobile terminal ID code. When called by the mobile terminal 10, the central controller 66 responds to call back the mobile terminal 10 with a confirmation message prompting the person to confirm the support-request by pressing either the confirmation key 41 or the cancel key 42. When recognizing that the cancel key 42 is pressed within a selected time, the central controller 66 cancels a further processing of giving the warning message. Otherwise, i.e., the confirmation key 41 is pressed within the time or neither key is pressed within the time, the central controller 66 acknowledges the support-request as valid and proceeds to locate the latest true position of the person based upon the latest valid GPS data and give the warning message including the calculated position and the related personal information. The warning message is sent to the display 64, thereby prompting to take a suitable support or rescue. In addition, the warning message may be accompanied with a corresponding voice warning.

Determination of the latest true position is made by the GPS calculator 62 under the control of the central controller 66. The current GPS data and the time-series sets of the GPS data transmitted from the mobile terminal 10 are stored in a memory 63 of the message center 60 together with the time stamps indicating when the individual GPS data are collected. Then, the GPS calculator 62 fetches the individual GPS data in descending order of the time stamps and checkes whether the GPS data is valid for calculation of the position of the mobile terminal. When the GPS calculator 62 firstly recognizes the GPS data as valid and successfully calculates the corresponding position, the central controller 66 treats the calculated position as the latest true position based upon the latest valid GPS data, and deactivates the GPS calculator 62, canceling the remaining GPS data. Then, thus calculate position is included in the warning message to be notified on the display together with the personal information. Therefore, even if the current GPS data or some of the GPS data in the time-series sets is invalid for determination of the position of the mobile terminal, the message center can obtain the position based upon the remaining valid GPS data for successfully estimating the position of the person.

In this embodiment, the mobile terminal 10 is programmed to transmit all the current and the time-series sets of the GPS data in response to the support request signal, however, it may be differently programmed to transmit the GPS data in the descending order of time one by one, while the message center 60 is modified so that the central processor 66 is cooperative with the GPS calculator 62 to give a stop signal as soon as the GPS data is found as valid GPS data so that the stop signal is transmitted to the mobile terminal 10 to stop transmitting the remaining GPS data.

Also, the acquisition of the time-series sets of the GPS data can be started when the mobile terminal 10 is disconnected from the charger 50. That is, upon disconnection of the mobile terminal 10, the charger detector 18 gives a start signal which activates the GPS receiver 20 to start acquiring the GPS data in accordance with the predetermined time schedule. Further, the collection of the GPS data can be started in answer to a start signal transmitted as an instruction from the message center 60.

At the message center 60, the central controller 66 is programmed to be capable of generating a follow-up request signal for continuously locating the person after requesting the support. When required, the central controller 66 gives the follow-up signal after a predetermined time from a first catch of successfully locating the position. The follow-up request signal is then transmitted to the mobile terminal 10, requesting to acquire a fresh GPS data and transmit it back to the message center 60. Thus, the message center can locate an updated position of the person moving from the original position.

The like follow-up search can be also initiated by the person oneself. For this purpose, the mobile terminal 10 includes a follow-up request switch 46 as one key of the input section 40, as seen in FIG. 3, by which CPU 12 instructs to a routine of acquiring a fresh GPS data periodically at a predetermined interval after the mobile terminal 10 transmits the GPS data as a consequence of the support-request signal. Every GPS data is transmitted to the message center 60 to update the position of the person moving from the original position detected in response to the support request signal, making it easy to take a suitable support or rescue of the person.

In addition to the above capability of locating the person as a consequence of the support-request signal, the system has a monitoring capability of logging the position of the person who is going to move out of the effective radio communication area or reenters the area even in the absence of the support-request signal by the person oneself. This is advantageous in a case where the search is requested by another person. For this purpose, the mobile terminal 10 includes a fade-in & fade-out detector 32 which regularly monitors the received filed intensity of the radio signal from the base station 81 so as to detect whether the mobile terminal 10 is moving closer to a border of the effective zone and whether the mobile terminal 10 reenters the communication area. That is, the data of the received field intensity varying with time is stored in the memory 18 and is analyzed to make such detection.

When the person carrying the mobile terminal 10 is detected to be moving closer to the border of the communication area, the detector 32 generates a fade-out warning signal. In response to the warning signal, CPU 12 activates the GPS receiver 20 to acquire a border GPS data indicative of a location near the border of the communication area, and then activates the radio communicator 30 to transmit the border GPS data together with the terminal ID code and a tag indicating the fade-out warning signal to the message center 60. The border GPS data is processed at the message center 60 to calculate the position of the person near the border to the communication area. The calculated position is related to the personal information and is stored in the memory 63 with the tag so that the message center 60 can retrieve the data, upon request, to give the last position when the person has moved out of the communication area, facilitating a survey of the person.

In detecting the person moving closer to the border of the effective radio communication area, it is preferred to analyze the received field intensity of the radio signal consecutively received over a relatively long time, i.e., to analyze the shape of the received field intensity varying with time. However, it is equally possible to use a somewhat simplified scheme of comparing the instant field intensity with the previous intensity each time the radio signal is received for the same detection purpose.

In order to avoid superfluous GPS data transmission from the mobile terminal 10, the detector 32 is cooperative with CPU 12 to give a revoke function of prohibiting the radio transmitter 30 from transmitting a fresh border GPS data in response to a further fade-out warning signal until an elapse of a predetermined time after the border GPS is transmitted to the message center 60 in response to the previous fade-out warning signal.

When the person is detected to reenter the effective radio communication area, the detector 32 generates a fade-in notice signal. In response to the notice signal, CPU 12 activates the GPS receiver 20 to acquire a fresh border GPS data indicative of a location near the border of the communication area, and then activates the radio communicator 30 to transmit the border GPS data together with the terminal ID code and a tag indicating the fade-in notice signal to the message center 60. The border GPS data is processed at the message center 60 to calculate the position of the person near the border to the communication area. The calculated position is related to the personal information and is stored in the memory 53 with the tag so that the message center 60 can retrieve the data, upon request, to know the last position when the person reentered the communication area, facilitating a survey of the person. Also for this reentrance detection purpose, the like analysis of the received field intensity as explained in the above can be utilized. Further, in order to avoid superfluous GPS data transmission, the detector 32 gives a revoke function of prohibiting the radio transmitter 30 from transmitting a fresh border GPS data in response to a further fade-in notice signal until an elapse of a predetermined time after the border GPS is transmitted to the message center 60 in response to the previous fade-in notice signal.

It is noted in this connection that the border GPS data stored in the memory 63 as resulting from the fade-out warning and fade-in notice signals can be retrieved at the message station 60 upon reception of the support-request signal, thereby giving at least the position of the person near the border of the communication area, even if all the GPS data accompanied with the support-request signal should be revealed invalid.

What is claimed is:

1. A support request processing system using GPS data for locating a person requesting a support, said system comprising:

a mobile terminal adapted to be carried by a person and having an identification (ID) code, said mobile terminal comprising:

a GPS receiver, said GPS receiver acquiring the GPS data from GPS satellites;

a radio transmitter, said radio transmitter transmitting said GPS data to a radio communication network; and a request key which, upon being activated, provides a support-request signal which activates said GPS receiver to acquire current GPS data and activates said radio transmitter to transmit said current GPS data together with said support-request signal and said ID code to said radio communication network;

a message center having a table storing a relation between said ID code and personal information about the person carrying said mobile terminal, said message center receiving said GPS data, said support-request signal, and said ID code from said mobile terminal through said radio communication network so as to calculate a position of said mobile terminal from said GPS data, and to relate thus calculated position to the personal information with reference to said table, said message center having an alarm means which gives a support-request message including said personal information and the related position of the mobile terminal for prompting a suitable support action, wherein said mobile terminal has a fail-safe recording means which acquire~ the GPS data from said GPS satellites at different times in accordance with a predetermined time schedule and store plural time-series sets of thus acquired GPS data, and said fail-safe recording means being linked to said radio transmitter so that the time-series sets of the GPS data are transmitted together with said current GPS data to said message center in response to said support-request signal.

2. The system as set forth in claim 1, wherein
said mobile terminal has a start key which activates said fail-safe recording means to store said time-series sets of said GPS data.

3. The system as set forth in claim 1, including:
a charger which is coupled to said mobile terminal to charge a rechargeable battery incorporated in said mobile terminal to energize the same,
said mobile terminal having a detector which detects a disconnection of said mobile terminal from said charger and provides a start signal upon detection of the disconnection, said start signal activating said fail-safe recording means to store said time-series sets of said GPS data.

4. The system as set forth in claim 1, wherein
said radio transmitter, said radio transmitter receiving a start signal from said message center through said radio communication network, said start signal activating said fail-safe recording means to store the plural sets of said GIRS data.

5. The system as set forth in claim 1, wherein
said mobile terminal is arranged to transmit said time-series sets of the GPS data to said message center set by set to give one set of the GPS data at one time in descending time sequence,
said message center comprising:
a check means which checks the GPS data whether or not the GPS data is valid for calculation of the position of said mobile terminal, and gives a stop signal as soon as the GPS data is found to be valid, said stop signal being transmitted to said mobile terminal through said radio communication network so as to stop transmitting the remaining sets of the GPS data.

6. The system as set forth in claim 1, wherein
said message center provides a follow-up request signal after a predetermined time from a first catch of calculating the position of said mobile terminal in reply to said support-request signal, said follow-up request signal being transmitted to said mobile terminal through said radio communication network,
said mobile terminal acting, in response to said follow-up signal, to cause said GPS receiver to acquire fresh GPS data, and to activate said radio transmitter to transmit the fresh GPS data to said message center for updating the position of the mobile terminal.

7. The system as set forth in claim 1, wherein
said mobile terminal has a follow-up means which makes a process of acquiring a fresh GPS data from said GPS satellite and transmitting the same to said message center periodically at a predetermined time interval after said mobile terminal transmits the time-series sets of said GPS data in response to said support-request signal.

8. The system as set forth in claim 1, wherein
said mobile terminal including a fade-out detecting means which detects whether said mobile terminal is moving closer to a border of an effective communication area with said message center based upon a received field intensity of a radio signal transmitted from a base station for said radio communication network, and generates a fade-out warning signal when said mobile terminal approaches the border of the effective communication area,
said mobile terminal acting, in response to said fade-out warning signal, to cause said GPS receiver to acquire a border GPS data indicative of a location near the border of said effective communication area, and to activate said radio transmitter to transmit the border GPS data and the fade-out warning signal together with the said ID code to said message center so that the message center can acknowledge the position of the mobile terminal in relation to the personal information about the person carrying said mobile terminal, and
said message center having a storing means which, in response to said fade-out warning signal, stores the calculated position in relation to the corresponding personal information and with a tag of indicating the presence of fade-out warning signal.

9. The system as set forth in claim 8, wherein
said fade-out detecting means detects whether said mobile terminal is moving closer to the border of the effective communication area each time said mobile terminal receives the radio signal from said base station.

10. The system as set forth in claim 8, wherein
said fade-out detecting means detects whether said mobile terminal is moving closer to the border of the effective communication area by analyzing the received field intensities of the radio signals consecutively received at said mobile terminal.

11. The system as set forth in claim 8, wherein
said mobile terminal has a revoke means which prohibits said radio transmitter from transmitting a fresh border GPS data in response to a further fade-out warning signal until an elapse of a predetermined time after the border GPS data is transmitted in response to the previous fade-out warning signal.

12. The system as set forth in claim 1, wherein
said mobile terminal including a fade-in detecting means which detects whether said mobile terminal reenters an effective communication area with said message center based upon a received field intensity of a radio signal transmitted from a base station of said radio communication network, and generates a fade-in notice signal when said mobile terminal reenters the effective communication area,
said mobile terminal acting, in response to said fade-in notice signal, to cause said GPS receiver to acquire a border GPS data indicative of a location near the border of said communication area, and to activate said radio transmitter to transmit the border GPS data and the fade-in notice signal together with the said ID code to said message center so that the message center can acknowledge the position of the mobile terminal in relation to the personal information about the person carrying said mobile terminal, and
said message center having a storing means which, in response to said fade-in notice signal, stores the calculated position in relation to the corresponding personal information and with a tag of indicating the presence of fade-in notice signal.

13. The system as set forth in claim 12, wherein
said fade-in detecting means detects whether said mobile terminal reenters the effective communication area each time said mobile terminal receives the radio signal from said base station.

14. The system as set forth in claim 12, wherein
said fade-in detecting means detects whether said mobile terminal reenters the effective communication area by analyzing the received field intensities of the radio signals consecutively received at said mobile terminal.

15. The system as set forth in claim 12, wherein
said mobile terminal has a revoke means which prohibits said radio transmitter from transmitting a fresh border GPS data in response to a further fade-in notice signal until an elapse of a predetermined time after the border GPS data is transmitted in response to the previous fade-in notice signal.

* * * * *